Aug. 15, 1961 R. S. WEBB 2,996,638
POWER FEED SYSTEM
Filed April 10, 1959 3 Sheets-Sheet 1

INVENTOR.
Robert S. Webb
BY
M. K. Murphy
ATTORNEY.

Aug. 15, 1961 R. S. WEBB 2,996,638
POWER FEED SYSTEM
Filed April 10, 1959 3 Sheets-Sheet 2

INVENTOR.
Robert S. Webb.
BY
M. K. Murphy
ATTORNEY.

INVENTOR.
Robert S. Webb.
BY
ATTORNEY.

United States Patent Office 2,996,638
Patented Aug. 15, 1961

2,996,638
POWER FEED SYSTEM
Robert S. Webb, Franklin, Mich., assignor to Elox Corporation of Michigan, Royal Oak, Mich., a corporation of Michigan
Filed Apr. 10, 1959, Ser. No. 805,607
10 Claims. (Cl. 314—61)

This invention pertains to improved apparatus for electrical-discharge-machining, sometimes called spark-machining or arc-machining, or EDM.

My improvement described and claimed herein relates to an improved power feed means for the EDM electrode.

In accordance with modern practice in the electrical-discharge-machining art, the electrode, which determines the shape and form of the hole or cavity being cut, is positioned with respect to the workpiece and fed toward the workpiece during machining by means of an automatic servo feed mechanism which responds to certain preset gap voltage and/or current conditions.

It has been the practice to make the motor which controls the position of the machining electrode responsive to changes in the average input to the machining gap. This system of feed control provides improved results over manual feed systems, but leaves much to be desired so far as accuracy of dimension and finish are concerned especially when relatively heavy electrodes are used.

In my improved power feed system disclosed herein, the power feed motor is made operable in response to striking voltages existing across the machining gap, rather than average voltages, and a voltage amplification system is interposed between the gap and the power feed motor which provides higher voltages and a wider variation of voltages on the motor in response to change in gap voltage, thus rendering the power feed more sensitive in operation.

By "striking voltage," I mean that peak voltage which exists for a period of time in the order of from one to two microseconds or, in other words, for a sufficient period to ionize the gap. I have found that transient voltages of much greater magnitude may exist across the gap for short periods of time insufficient to cause ionization thereof. My invention contemplates utilization of striking voltages existing across the gap—that is the voltages causing firing of the gap.

My improvement will be better understood by reference to the accompanying drawings, in which:

FIG. 6 is a modification of the FIG. 5 circuit;

Figure 1:
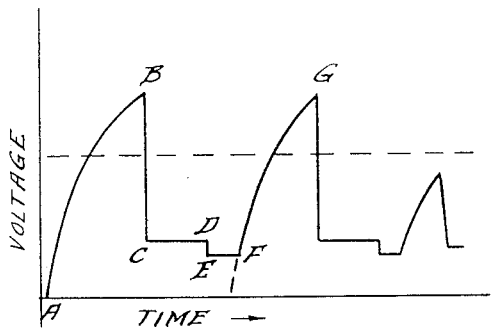
FIG. 1 is a graphic representation of the voltage wave form commonly encountered in condenser charging EDM circuits.
Figure 2:
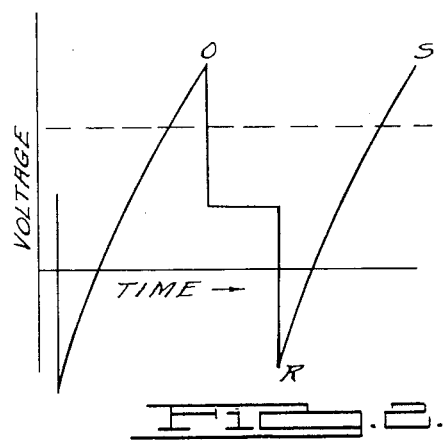
FIG. 2 is another example of the same.

Referring to FIGS. 1 and 2, FIG. 1 shows a typical voltage wave curve where the condenser is charging from A to B, the gap dielectric breaks down at B, and the gap voltage falls rapidly to point C. Conduction through the gap occurs from C to D then through normal discharge of the condenser the gap voltage falls to E which is below that required for gap ionization, whereupon the condenser recharges as indicated by curve FG and the cycle is repeated. Note that curve CDEF is positive at all times, this being characteristic of one particular balance condition of circuit inductance and capacity.

FIG. 2 illustrates a condition wherein the gap discharges along line OR, falls quite negative at R, at which point the discharge ceases and normal condenser charging occurs as indicated by line RS.

In EDM power feed control systems, the significant factor which controls the spacing of the electrode and workpiece is the breakdown potential of the dielectric between the two. For a dielectric having a uniform gradient of dielectric strength, the gap spacing will be exactly the same for a specific breakdown voltage. For example, consider a uniform dielectric with a strength of 100 volts per inch. Then, any time a potential of 100 volts is applied across a gap of one inch spacing, the dielectric will rupture and a discharge will occur. Therefore, if the spacing is greater than one inch, no discharge will occur; and if the electrode is fed downwardly, it can not approach the workpiece closer than one inch without a discharge occurring. It is thus clear that the peak or striking voltage of any given wave form, as indicated at B, G, O and S, in FIGS. 1 and 2, is the only voltage of any real importance in the control of a power feed servo for EDM.

However, the average voltage swing across the gap, and even the peak to peak voltage swing, may vary considerably from the striking voltage. It will vary significantly between wave forms having the same striking voltage but different shapes. In past development of the art, all power feed control circuits have utilized an average gap voltage, or no voltage at all, i.e. a true short circuit as a power feed signal. These circuits function fairly well, that is to say, the electrode will back up on short circuit and feed downwardly on open circuit. With an averaging input to the power feed, circuit parameters can be adjusted such that satisfactory cutting will take place provided the wave form does not change.

Figure 3:
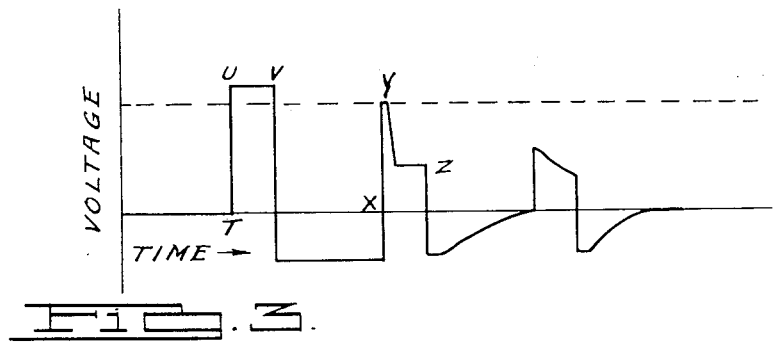
FIG. 3 is an example of the voltage wave form of a gap discharge in an impedance matching transformer EDM circuit or other circuit where there is substantially no capacity across the discharge gap.

In FIG. 3, I have shown graphically the gap voltage wave form encountered in a typical impedance matching transformer EDM circuit or in other types of circuitry where there is no capacity across the gap. Here the open circuit wave form is indicated by curve TUV, the peak voltage being the same as in FIGS. 1 and 2. Curve XYZ depicts a condition where the gap fires at Y, the time duration being YZ. Greater spacing of electrode and work might cause the gap to fire at point U. It can be seen that so far as average voltage is concerned, there is very little difference between a gap that fires at a voltage equivalent to point U of FIG. 3 for example and one that fires at point Y, yet this minute difference caused by the higher striking voltage in one instance represents the entire difference in gap spacing control between too great and too narrow gap spacing. Gap spacing is the same for the breakdown voltages indicated at points B, G, O, S and U of FIGS. 1–3, and a striking voltage reading power feed control would show no difference in input.

In the operation of EDM equipment, variations in gap breakdown voltages occur for several reasons including these:

(1) Insufficient sensitivity in the servo-feed, that is, one pulse may strike immediately before the electrode advances, another pulse immediately after it has advanced.

(2) Accumulation of sludge in the gap.

(3) Variations in electrode and workpiece erosion (one minute area breaks down or flakes off before another).

(4) Variation in coolant dielectric strength.

(5) Machine vibration causing uneven advance of the electrode.

These variations cause fluctuations in striking voltage, causing, in turn, random circuit operation between extreme limits, yet satisfactory cutting takes place unless the voltage difference between striking voltage and that at which the discharge ceases becomes very small, under which circumstance the machine tends to become unstable. Obviously a loss in cutting efficiency occurs when the power feed wanders beyond the open circuit voltage indicated by points B, G, O, S, U, or below the point C, the latter being practically a short circuit condition. Then, too, when the gap spacing is too large, excessive overcut occurs which may be very undesirable where dimensional accuracy and finish are of extreme importance, especially in high voltage machines.

It is thus clear that the striking voltage is of utmost importance in the control of automatic EDM equipment.

Figure 4:
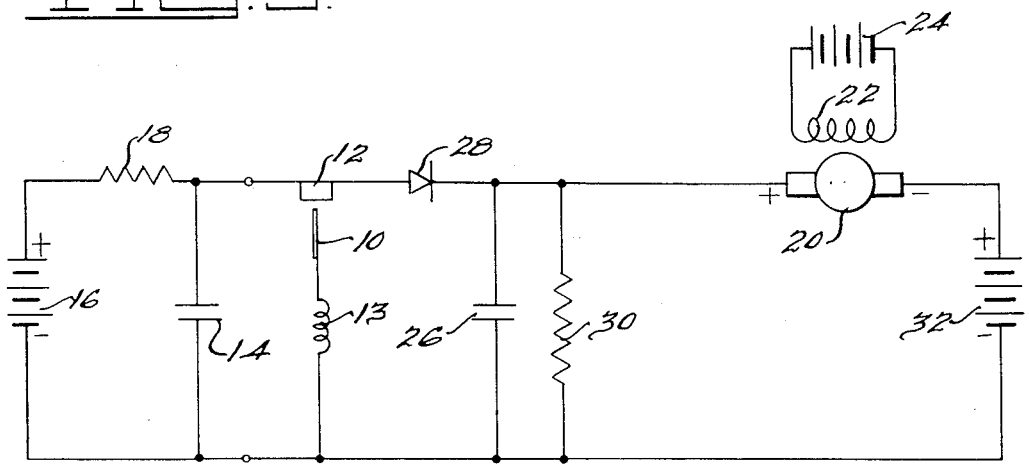
FIG. 4 is a schematic circuit diagram of a relaxation oscillator type discharge machining apparatus and power feed therefor, the gap wave form of which might be as depicted in either FIG. 1 or 2.
Figure 4:
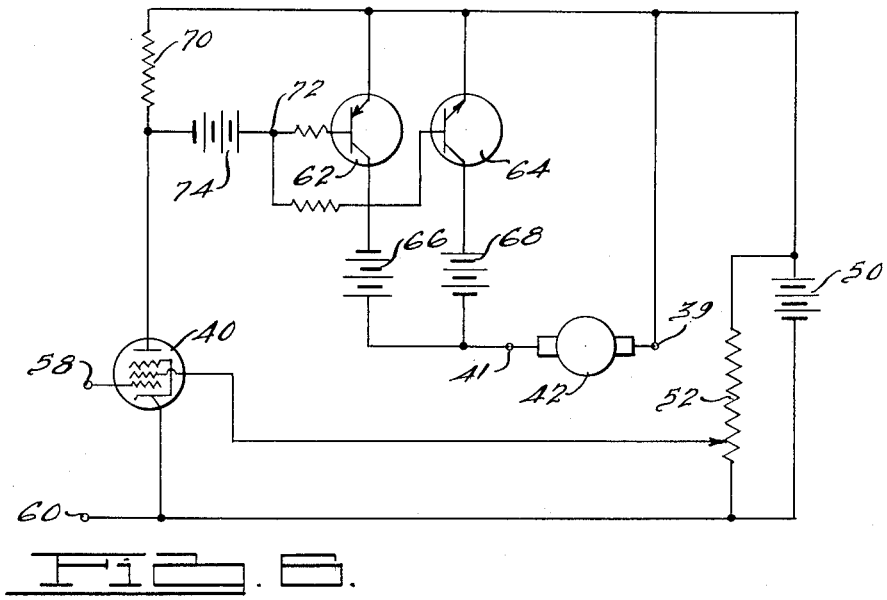

Reference is now made to FIG. 4 in which I have shown schematically a more or less conventional EDM circuit of the relaxation oscillator type. Here the electrode 10 is disposed in spaced relation with a workpiece 12, and the oscillator comprises a condenser 14, a voltage source 16 and resistor 18 connected across the discharge gap as shown. Inductance 13 represents the lumped inductance inherent in the circuit. It will be understood that a more refined power supply, such as that shown in Matulaitis Patent 2,804,575, may be used.

The gap discharge and charging characteristic of such a circuit is that of FIG. 1. The condenser 14 charges as indicated by curve AB, and the gap strikes at B, and the voltage falls along curve BCDE.

The position of the electrode 10 is controlled by an electric motor having an armature 20 and a field 22 supplied by a voltage 24. The armature 20 is operatively coupled to the electrode 10 by means of a speed reducing gearbox and a rack and pinion or other suitable mechanism not shown. The motor is reversible in accordance with the direction of the voltage across armature 20, and the electrode is adjusted accordingly. Such electrode servo-feeds are well known in the art and details thereof have been omitted in the interest of simplification and brevity.

A second condenser 26 is connected across the gap between electrode 10 and workpiece 12 and is charged from gap voltage source 16 through rectifier 28. It will be seen therefore that gap peak voltage B (FIG. 1) will be stored in condenser 26 upon each swing of the voltage, and this stored voltage will not deteriorate along curve BCDE because rectifier 28 blocks discharge to the gap from condenser 26. It will be understood that the gap striking voltage is not necessarily the actual peak voltage of source 16, the magnitude thereof being controlled by the gap spacing.

A source of reference voltage 32 is connected to the armature 20 in bucking relationship to the voltage source 16, and a shunt resistor 30 is connected across condenser 26. The voltage source 32 may be called the "backup voltage" because it tends to cause motor armature 20 to retract electrode 10 from the workpiece. When the backup voltage exceeds the voltage across the armature derived from the relaxation oscillator circuit, the electrode will be retracted from the workpiece and when the opposite is true, the electrode will be advanced. When the voltages are balanced across the armature, the electrode will be held in optimum cutting relationship as predetermined by selection of the circuit parameters.

In the operation of the system schematically shown in FIG. 4, let it be assumed that the open circuit voltage 16 is higher than reference voltage 32. This peak voltage will then be stored in condenser 26 and current will flow from condenser 26 through armature 20 in such direction that the armature will downfeed or advance the electrode 10. As the electrode advances, the striking voltage B (FIG. 1) will of course decrease in magnitude because the gap will fire at a lower voltage and the peak voltage stored in condenser 26 will decrease and finally become equal in magnitude to that of source 32, whereupon the electrode will cease its downfeed. Should the electrode advance too much, the peak voltage stored in condenser 26 will be less than the magnitude of source 32 and the armature will reverse causing backup of the electrode to equalize the voltages. The power from reference source 32 is of course blocked from the gap by rectifier 28. Shunt resistor 30 dissipates the energy stored in condenser 26 not utilized in operation of the armature 20, and provides a shunt for current through the armature from source 32 during a condition of back-up.

It is seen therefore that armature 20 is responsive to the striking voltages of the gap discharge circuit rather than to the average voltage as is the case in prior art devices such as shown in McKechnie Patent No. 2,588,744.

The FIG. 4 circuit is somewhat disadvantageous when large, heavy electrodes are used such as when cutting forging die cavities and the like because relatively large increments of power must be taken from the gap supply circuit for storage in condenser 26, which power is necessary for proper response of armature 20 but is largely wasted in discharge across resistor 30. Then, too, the FIG. 4 power feed circuit is operable only with a condenser-discharge type of gap supply because of the relatively poor time response of silicon power diode 28 and is thus limited in its application.

Figure 5:
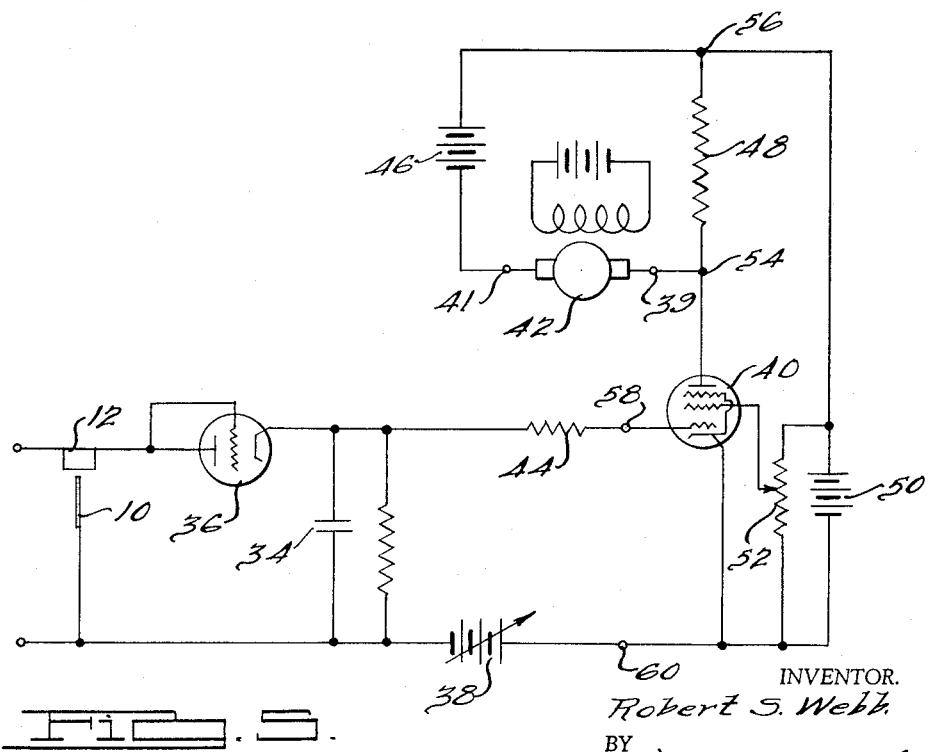
FIG. 5 is a schematic circuit diagram of a striking voltage reading power feed control for EDM apparatus having an impedance matching power supply.

FIG. 5 shows a peak reading power feed circuit employing vacuum tubes. The one important factor in each of the power feed circuits shown is that the striking voltage existing across the gap must be somehow stored for a sufficient length of time to provide stable operation of the power feed motor. The duration of this striking voltage is short—in the order of one microsecond or less in precision machines and a more refined circuit, such as the one under consideration, is required to record it and transmit a satisfactory signal.

In FIG. 5, the electrode 10 and workpiece 12 are connected across a suitable pulsing power supply, such as, for example, that shown and claimed in my co-pending application Serial No. 747,078, filed July 7, 1958. The peak voltage of the gap is stored in condenser 34 which is charged through diode 36. A voltage source 38 is the reference voltage which is compared with striking voltage for control purposes. The source 38 provides suitable negative bias on the grid of pentode 40 to render the tube normally nonconductive. The tube 40 may be a bank of tubes connected in parallel or a tube of sufficiently high power capacity to operate armature 42. A current limiting resistor 44 is connected in the grid circuit of the pentode tube 40.

Backup voltage source 46 is connected in series with signal resistor 48, the two being in shunt across armature 42. Downfeed voltage source 50 is connected in series with source 38 and in bucking relation with source 46. Terminal 54 is connected to the plate of tube 40 and between armature 42 and resistor 48. A potentiometer 52 is connected in shunt across voltage source 50 and to the screen grid of tube 40.

In this circuit, source 38 is used for reference only, sources 46 and 50 supplying the power required for rotating the armature 42. The armature 42 is of considerably higher voltage requirement than that used in the FIG. 4 circuit for example. In instances where motor armatures of higher power requirements are used, it would be desirable to connect an amplifier across terminals 54, 56, to provide more power for armature rotation.

Operation of the circuit is as follows:

Voltage source 38 is adjusted to render tube 40 nonconductive when the peak voltages stored in condenser 34 are below desired magnitude in accordance with the machining conditions selected. A rise in voltage across condenser 34 signals increased gap spacing and this higher voltage render pentode 40 more conductive and causes electron flow negative to positive from terminals 39 to 41, thereby rotating armature 42 to downfeed the electrode 10. In the absence of a signal, tube 40 is cut off and armature 42 will rotate in opposite direction to retract electrode 10, power being supplied from voltage source 46 through resistor 48.

In FIG. 5, the armature 42 will be normally of higher power requirement than the armature of FIG. 4. For motor armatures of this type, an amplifier, preferably of the transistor type, may be connected across terminals 39—56.

At a null condition with no armature rotation, the voltage across condenser 34 is sufficient to render tube 40 partially conductive whereupon the voltage drop across resistor 48 balances the source 46. Normally the voltage on condenser 34 is slightly in excess of this null condition causing tube 40 to be somewhat more conductive, in which case the voltage across 48 slightly exeeds source 46 and slow rotation of the armature 42 occurs to cause electrode advance in accordance with the stock removal.

FIG. 6 shows one form of transistorized power feed control. This circuit is a modification of FIG. 5 and that portion of the modified circuit beyond points 58—60 is shown.

In FIG. 6, a pnp type transistor 62 and an npn type transistor 64 are connected in parallel across the armature 42, voltage sources 66, 68, being connected in series and opposite polarity relationship between the armature and the respective transistors.

Development of a suitable voltage signal across resistor 70 in response to conduction of tube 40, will cause point 72 to become negative and transistor 62 will be rendered conductive and voltage 66 will be applied to the armature 42, thus causing downfeed.

When the voltage signal received from condenser 34 is insufficient to cause tube 40 to conduct, no voltage will be developed across resistor 70 and reference point 72 will become positive. This will cut off transistor 62 and cause transistor 64 to conduct. Voltage 68 will then supply backup power to armature 42, causing electrode 10 to retract.

It will be seen that when the voltage across resistor 70 is equal to voltage source 74, the reference point 72 will be at zero potential and both transistors will be cut off. This is the null condition of this circuit, and this null point is of course adjusted to occur when the peak voltages stored in condenser 34 correspond to the desired striking voltage as indicated in FIG. 3. Striking voltages above this value will cause electrode downfeed because of an increase in signal voltage on resistor 70, and striking voltages below this value will cause drop in signal voltage on resistor 70 and electrode retraction. Thus it will be seen that FIG. 6 achieves true push-pull operation.

As stated, the above described power feed systems all embody an electric motor for adjusting the position of the electrode. The motor is usually connected to the electrode holder through a high ratio reduction gearing and a highly satisfactory feed system results. However, when electrodes of relatively great weight are used as, for example, when machining large forging and stamping dies, the power feed motor and associated apparatus becomes rather bulky, there is a noticeable slowing of the signal response and some mechanical backlash becomes inevitable.

Figure 7:
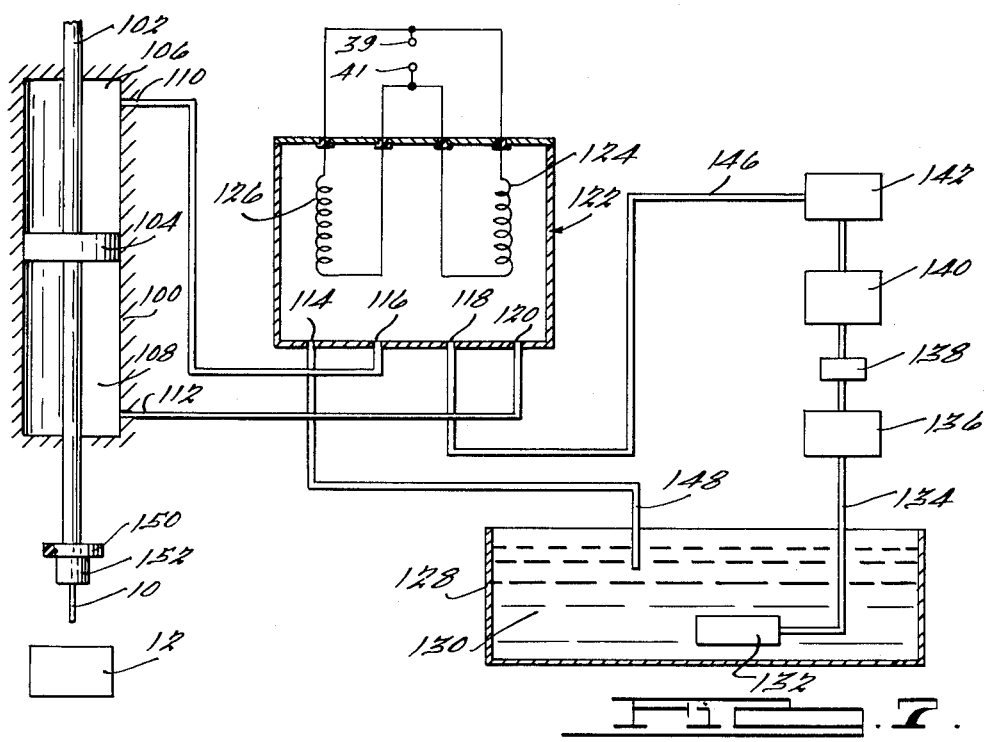
FIG. 7 is a schematic showing of a hydraulically actuated power feed mechanism adapted to be controlled by the FIG. 5 or FIG. 6 circuit.
Figure 8:
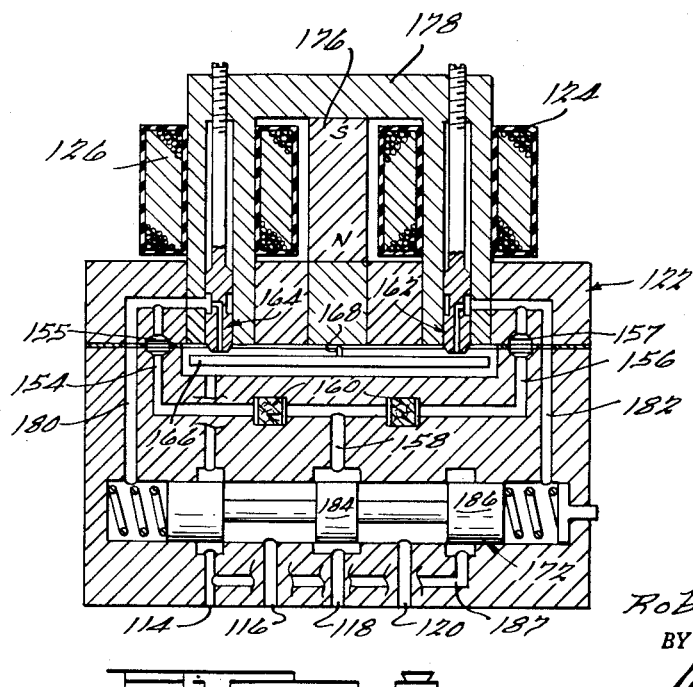
FIG. 8 is an enlarged sectional view of the hydraulic control valve used in the mechanism of FIG. 7.

I have found that positioning of the electrode by hydraulic means overcomes the aforementioned objections provided that a quick-response, low inertia control valve is used. FIGS. 7 and 8 show such a hydraulic system.

Referring to these figures, it will be seen that terminals 39 and 41 of FIG. 7 are identical with terminals 39 and 41 of FIGS. 5 and 6, or of the corresponding armature connections of FIG. 4. The sensing and amplifying circuits described above, therefore, may be identical and will not be again described.

The electrode 10 (which may weigh a few ounces or several hundred pounds) is held in a collet 152 carried by an insulating plate 150. The latter is in turn carried by piston rod 102 which is attached to piston 104 in cylinder 100. It will be understood that cylinder 100 is rigidly mounted on the machine column. The hydraulic servo control valve which regulates flow of fluid to each end of cylinder 100 is generally designated by numeral 122. This valve is shown in detail in FIG. 8.

The fluid circuit comprises a reservoir 128 which contains fluid 130. The fluid is drawn through screen 132 through input suction line 134 by pump 136. The pump, which operates in a range of from 500 to 3000 p.s.i. forces the fluid through check valve 138 and filter 140 to accumulator 142, which stores hydraulic pressure and eliminates surging. Pressure line 146 connects with input port 118 of valve 122. The hydraulic circuit is completed by the valve through the hydraulic cylinder, and any flow of fluid is exhausted by valve exhaust port 114 into line 148.

As seen from FIG. 8, the valve 122 has a pair of energizable coils 124—126. These coils may be connected in series, parallel or in "push-pull," it being necessary only to correctly phase the coils such that the desired operation is obtained with a reversal of polarity across them. In this instance, the coils are connected in parallel. The valve 122 is a two-stage valve and embodies a sensitive first stage and a second stage which is operable in response to operation of the quickly responsive first stage. In other words, there is hydraulic amplification in the valve itself which causes the relatively low differential pressures developed in the first stage to be amplified in the second stage in such manner that much higher pressures are applied to operation of the piston 104.

The first or electrically operated stage of the valve is controlled by the flapper 166. This flapper is pivotally mounted at 168 and its position is governed by permanent magnet 176 and by coils 124, 126, which add or subtract flux in accordance with energization thereof.

The enlarged spool portions of the valve spool 172 are so proportioned that in the null condition illustrated, sufficient clearance is provided such that a leakage flow of from 10% to 20% of normal flow is permitted through the valve. That is to say, fluid flows through pressure port 118, around portion 184, through passage 158, filters 160, passages 154 and 156 to nozzles 162, 164. Passages 180, 182, and ports 116 and 120 are open to this flow, but inasmuch as the valve is balanced, no action results. Passages 154 and 156 have conventional fixed orifices 155, 157, which meter the flow from the passages.

Let it be assumed that the polarity of terminals 39—41 (FIG. 7) is such that downfeed of the electrode 10 is called for. In such instance, coils 124, 126, are energized in such polarity that flapper 166 is attracted toward nozzle 164 and away from nozzle 162. As flapper 166 moves toward nozzle 164, increased pressure is developed in passage 180, and pressure is decreased in passage 182, by virtue of the relative restriction of the fixed and nozzle orifices, and valve spool 172 is moved to the right. This exposes port 116 to full pressure of port 118 and port 120 is opened to exhaust port 114 by movement of spool portion 186 to uncover passage 187. Thus pressure is increased at port 116 and decreased at port 120, and piston 104 will be moved downwardly.

When electrode retraction or backup is signalled, coils 124, 126, are oppositely polarized and opposite movement of flapper 166 causes pressure on port 120 and exhaust on port 116.

The advantage of the two-stage valve in operation of the power feed is believed clear from the above when it is considered that redistribution of fluid pressures from the first valve stage may result in only one or two pounds per square inch net differential on spool 172. Cylinder 100 may be operated at 1000 p.s.i. or more and have a ram area of 10 square inches or more to generate up to 50,000 pounds of force. To operate spool 172 directly with sufficient sensitivity would be extremely difficult, while operation of flapper 166 with the relatively small electrical forces available is entirely practical. Thus an extremely sensitive, quick acting and high power feed mechanism results.

Furthermore as pointed out above, the hydraulic power feed system just described is entirely free of backlash. As is well known, spur gears inherently have considerable backlash and this causes a considerable amount of loose coupling in all-electric power feed systems which must use a reducing gear train.

In a typical EDM operation, the electrode may downfeed at a rate of 20 inches per minute. As the electrode approaches the workpiece and establishes a gap of approximately .003 inch, machining begins, and the servo must establish a null condition and thereafter feed at a very slow rate. If there is backlash in the system to any considerable degree, the electrode will overrun and the sensing circuit will instantly signal backup. Upon backup, the backlash causes overrun in the opposite direction and a continuous hunting action is set up which is detrimental to the stable operation of the device.

In my improved hydraulic feed system which is fluid tight with no entrapped air or gas, and continuously circulatory, hunting is entirely eliminated. Electrode movement of a few thousandths or even a few ten thousandths of an inch or full downfeed at 20 inches per minute is accomplished with substantially no backlash with properly built equipment, even with large electrodes. Rapid deceleration of the electrode, for example, will tend to compress the hydraulic fluid, but as the fluid is substantially noncompressible, the result is that the electrode is stopped in a shorter distance with no hunting.

There is, of course, some minute compressibility of the fluid and some bending or deflection of the mechanical elements, but this is slight and not objectionable. The superiority of the hydraulic over the mechanical feed system is in the order of 10 to 1000 times depending upon the size of the equipment.

Another significant advantage resides in the increased sensitivity or, in other words, in the faster response. The hydraulic system is charged to full pressure at all times and initiation of or reversal of operation is accomplished simply by actuation of a light servo valve. This valve has comparatively low mechanical and electrical inertia, as compared with the armature of a large electric motor for instance, and thus response time is much less.

It will be understood, of course, that while I show and describe power feed means for advancing and retracting the electrode relatively to the workpiece, the power feed means could be readily made to advance and retract the workpiece relatively to the electrode, and in the claims appended hereto, I do not intend to limit the scope of my invention to the disclosure which has been made for illustrative purposes only.

I claim:

1. In combination with electrical-discharge-machining apparatus having means for causing intermittent erosive electrical discharge across a gap between an electrode and a workpiece in the presence of suitable coolant, an electrode power feed means automatically operable to advance and retract the electrode relatively to the workpiece in response to change in voltage conditions across the gap, means for rendering the power feed means operably responsive to gap striking voltage comprising an energy storage network connected across the gap, means for causing said network to store gap striking voltages, and means for causing said power feed means to operate in response to said stored voltage.

2. In combination with electrical-discharge-machining apparatus, power feed means for the machining electrode operable to advance and retract the electrode in response to variations in machining gap voltage, said power feed means including electrically controlled motive means, means for applying to said motive means voltages of opposed polarity, means for controlling the potential of said opposed voltages thereby to cause movement of said motive means in one direction or the other and to cause said motive means to remain stationary, means for sensing the striking voltages existing across the machining gap, and means for regulating the net voltage applied to said motive means in response to variation in gap striking voltages.

3. The combination set forth in claim 2 wherein said sensing means comprises a condenser connected across the machining gap and a diode connected in series with said condenser.

4. The combination set forth in claim 2 wherein said sensing means comprises a network for sensing gap striking voltages and means comprising a reference voltage source and means for delivering the net difference between the average of said striking voltages and said reference voltage to said regulating means as a signal to trigger operation of said regulating means.

5. In combination with electrical discharge machining apparatus having automatic power feed means for the electrode including electrically controlled motive means, means for selectively applying voltages of opposite polarity to said motive means to control actuation thereof, said means including a vacuum tube, means for rendering said vacuum tube conductive or non-conductive in response to signals received from the machining gap of said apparatus, and means for sensing and storing gap striking voltages such that said signal is responsive to the average of said gap striking voltages.

6. In combination with electrical discharge machining apparatus having an automatic motor driven power feed, means for controlling the power feed motor comprising, a pair of voltage sources of equal magnitude and opposite polarity, means connecting one of said sources across the motor control winding through a pnp junction transistor, means connecting the other voltage source across said control winding through an npn junction transistor, means for sensin voltage conditions in the machining gap, a source of reference voltage, and means for rendering said transistors alternately conductive in response to the net voltage difference between gap voltage and said reference voltage.

7. In combination with electrical machining apparatus, power feed means for the machining electrode operable to advance and retract the electrode in response to variations in voltage across the machining gap, said power feed means including electrically responsive motive means, means for applying to said motive means voltages of opposed polarity, means for controlling the potential of said opposed voltages thereby to cause operation of said motive means in one direction or the other or to remain in null condition, means for sensing the striking voltages existing across the machining gap, and means for regulating the net voltage applied to said motive means in response to variation in gap striking voltage.

8. In combination with electrical machining apparatus, power feed means for the machining electrode operable to advance and retract the electrode in response to variations in machining gap voltage, said power feed means including a hydraulic motor for advancing and retracting said electrode, a source of hydraulic pressure, a valve for regulating said hydraulic pressure and for delivering it to said motor, means for continuously circulating pressure fluid through the valve when the valve is in neutral position such that the system is pressurized at all times, means for controlling fluid flow through said valve including a movable flow control element and electromagnetic means for controlling the position of said flow control element, and sensing means for sensing variations in gap voltage and for transmitting an appropriate signal to said electromagnetic means.

9. In combination with electrical erosion apparatus having means for passing current across a gap between an electrode and a conductive workpiece, means for maintaining preset gap spacing between the electrode and workpiece and for feeding the electrode toward the piece comprising, a hydraulic motor for controlling the position of said electrode, a source of fluid pressure, a valve connected between said source and said motor, means in said valve operable when the valve is in neutral providing continuous fluid circulation such that the hydraulic system is pressurized at all times, output control means in said valve operable upon movement thereof to provide pressure differential in the hydraulic system, a first control stage in said valve, electromagnetic means for controlling said first control stage, means operatively connecting said first control stage and said output control means such that movement of said output control means is responsive to movement of said first control stage, and a sensing circuit for sensing gap spacing and for signalling variations therein to said electromagnetic means.

10. The combination set forth in claim 8 wherein the power feed means is responsive to gap striking voltage.

No references cited.